(12) United States Patent
Terry

(10) Patent No.: US 7,020,151 B2
(45) Date of Patent: Mar. 28, 2006

(54) FLOW CONTROL OF A SPREAD SPECTRUM MULTIUSER CHANNEL

(75) Inventor: Stephen E. Terry, North Port, NY (US)

(73) Assignee: InterDigital Technology Corporation, Wilmington, DE (US)

(*) Notice: Subject to any disclaimer, the term of this patent is extended or adjusted under 35 U.S.C. 154(b) by 557 days.

(21) Appl. No.: 10/053,969

(22) Filed: Jan. 22, 2002

(65) Prior Publication Data

US 2002/0061026 A1 May 23, 2002

Related U.S. Application Data

(63) Continuation of application No. 09/569,731, filed on May 12, 2000, now Pat. No. 6,738,368.

(51) Int. Cl.
*H04L 12/28* (2006.01)

(52) U.S. Cl. .................. 370/414; 370/235; 370/444
(58) Field of Classification Search ................ 370/230, 370/235, 252, 253, 413, 414, 443, 444, 462, 370/237, 239, 229, 395.42, 395.43, 412, 370/418, 416
See application file for complete search history.

(56) References Cited

U.S. PATENT DOCUMENTS

| | | | |
|---|---|---|---|
| 4,630,261 A | 12/1986 | Irvin | 370/235 |
| 5,278,828 A | 1/1994 | Chao | 370/394 |
| 5,317,562 A | 5/1994 | Nardin et al. | 370/428 |
| 5,666,348 A * | 9/1997 | Thornberg et al. | 370/230 |
| 5,729,540 A | 3/1998 | Wegrzyn | 370/336 |
| 5,742,588 A | 4/1998 | Thornberg et al. | 370/236 |
| 5,754,541 A * | 5/1998 | Glisic et al. | 370/335 |
| 5,802,310 A | 9/1998 | Rajaraman | 709/234 |

(Continued)

FOREIGN PATENT DOCUMENTS

| | | |
|---|---|---|
| EP | 430570 A2 | 6/1991 |
| EP | 707386 A2 * | 4/1996 |
| EP | 877512 A2 | 11/1998 |
| EP | 877512 A1 | 11/1998 |
| JP | H345051 | 2/1991 |
| WO | WO 9622666 A1 * | 7/1996 |
| WO | 9833349 | 7/1998 |

OTHER PUBLICATIONS

Aldama, E., et al. "Outage Effects on the TCP–Wireless Integration for Data/Voice Services in CDMA Systems Using Multiple Access". IEEE 49th Vehicular Technology Conference. May 16–20, 1999. vol. 2. pp. 1717–1721.*

Okada, H. et al. "CDMA Unslotted Aloha Systems with Finite Buffers". IEEE International Universal Personal Communications. Oct. 5–9, 1998. vol. 2. pp. 1143–1147.*

Chao et al., "Queue Management with Multiple Delay and Loss Priorities for ATM Switches," IEEE International Conference on Communications, 1994, ICC 94, SUPERCOMM. New Orleans, LA, May 1–5, 1994, vol. 2, pp. 1184–1189.

(Continued)

*Primary Examiner*—Hassan Kizou
*Assistant Examiner*—Donald L Mills
(74) *Attorney, Agent, or Firm*—Volpe and Koenig, P.C.

(57) ABSTRACT

Packet data from multiple types of data sources is stored. The data sources have reroutable and non-reroutable data. The multiple types of data sources flow into a multiuser channel in a wireless spread spectrum code division multiple access communication system. A queue for incoming data from each data source is provided. A backlog of data in the queue is tracked. Based on in part the tracked backlog, data flow from each of the data sources is limited. For each data source capable of rerouting packet data, packet data is selectively rerouted. For each data source not capable of rerouting packet data, packet data is selectively not sent.

2 Claims, 7 Drawing Sheets

U.S. PATENT DOCUMENTS

| | | | |
|---|---|---|---|
| 5,838,677 A | | 11/1998 | Kozaki et al. ............... 370/389 |
| 6,078,568 A | * | 6/2000 | Wright et al. ................ 370/312 |
| 6,091,725 A | | 7/2000 | Cheriton et al. ............. 370/392 |
| 6,105,070 A | | 8/2000 | Gaylord ........................ 709/232 |
| 6,122,253 A | | 9/2000 | Jones ........................... 370/235 |
| 6,285,662 B1 | * | 9/2001 | Watanabe et al. ........... 370/280 |
| 6,330,603 B1 | | 12/2001 | Seki et al. .................... 709/226 |
| 6,418,136 B1 | * | 7/2002 | Naor et al. ................... 370/347 |
| 6,421,335 B1 | * | 7/2002 | Kilkki et al. ................. 370/342 |
| 6,424,624 B1 | | 7/2002 | Galand et al. ................ 370/231 |
| 6,496,513 B1 | | 12/2002 | Takamichi .................... 370/434 |
| 6,507,572 B1 | * | 1/2003 | Kumar et al. ................. 370/335 |
| 6,567,420 B1 | * | 5/2003 | Tiedemann et al. .......... 370/468 |
| 6,674,765 B1 | * | 1/2004 | Chuah et al. ................. 370/458 |

OTHER PUBLICATIONS

Liebeherr et al., "Priority Queue Schedulers with Approximate Sorting in Output–Buffered Switches," IEEE Journal on Selected Areas in Communications, Charlottesville, VA, Jun. 1999, vol. 17, Iss. 6, pp. 1127–1144.

Aldama et al, "Outage Effects on the TCP–Wireless Integration for Data/Voice Services in CDMA Systems Using Multiple Access," IEEE 49$^{th}$ Vehicular Technology Conference, May 16–20, 1999, vol. 2, pp. 1717–1721.

Okada et al., "CDMA Unslotted Aloha System with Finite Buffers," IEEE International Universal Personal Communications, Oct. 5–9, 1998, vol. 2, pp. 1143–1147.

TSGW3#n(99)395, "Draft LS to RAN 2, Common Channel Management Over Iur," TSG–RAN Working Group 3 Meeting #3, Nortel Networks, Kawasaki, Japan, Apr. 26–30, 1999.

TSGR3#3(99)289, "Report of [ARC/1] Study Item Common Transport Channels (FACH, RACH, DSCH) on Iur," (Draft), TSG–RAN Working Group 3 (Architecture), Kawasaki, Japan, Apr. 26–30, 1999, pp. 1–5.

TS 25.321 V2.0.0 (Apr. 1999), "MAC Protocol Specification," 3$^{rd}$ Generation Partnership Project (3GPP), Technical Specification Group (TSG) RAN, Working Group 2, 1999.

Chao et al., "Queue Management with Multiple Delay and Loss Priorities for ATM Switches," IEEE International Conference on Communications, 1994, ICC 94, SUPERCOMM. New Orleans, LA, May 1–5, 1994, vol. 2, pp. 1184–1189.

Liebeherr et al., "Priority Queue Schedulers with Approximate Sorting in Output–Buffered Switches," IEEE Journal on Selecte Areas in Communications, Charlottesville, VA. Jun. 1999, vol. 17, iss. 6 pp. 1127–1144.

* cited by examiner

FACH Prioritization 72

| Type | Source | Destination | | Class | Suggested Priority |
|---|---|---|---|---|---|
| | | No Iur | Across Iur | | |
| CCCH (Signaling) | RLC | X | X | Mandatory | Medium |
| DCCH (Signaling) | MAC-d | X | X | Best Effort | Medium |
| DTCH (Traffic) | MAC-d | X | X | Best Effort | Low |
| DSCH (Control) | MAC-sh | X | | Mandatory | Highest |
| USCH (Control) | MAC-sh | X | | Mandatory | Highest |
| H-ARQ (Control) | MAC-d | X | X | Mandatory | High |
| H-ARQ (Control) | MAC-sh | X | | Mandatory | Highest |

FIG. 5

FLOW CONTROL OF A SPREAD SPECTRUM MULTIUSER CHANNEL

This application is a continuation of U.S. patent application Ser. No. 09/569,731, filed on May 12, 2000 now U.S. Pat. No. 6,738,368.

BACKGROUND

The invention generally relates to channels used by multiple users in a wireless code division multiple access spread spectrum system. More specifically, the invention relates to a system and method of prioritizing and controlling the flow of data for common and shared channels in a spread spectrum system.

FIG. 1 illustrates a simplified wireless spread spectrum code division multiple access (CDMA) communication system 18. A node b 26 within the system 18 communicates with associated user equipment 20–24 (UE). The node b 26 has a single site controller (SC) 30 associated with either a single (shown in FIG. 1) or multiple base stations 28. A Group of node bs 26, 32, 34 is connected to a radio network controller (RNC) 36. To transfer communications between RNCs 36–40, an interface between the RNCs (IUR) 42 is utilized. Each RNC 36–40 is connected to a mobile switching center (MSC) 44 which in turn is connected to the core network 46.

To communicate within the system 18, many types of communication channels are used, such as dedicated, shared and common. Dedicated channels transfer data between a node b 26 and a particular UE 20–24. Common and shared channels are used by multiple UEs 20–24 or users. All of these channels carry a variety of data including traffic, control and signaling data.

Since shared and common channels carry data for different users, data is sent using protocol data units (PDUs) or packets. As shown in FIG. 2, to regulate the flow of data from differing sources 48–52 into a channel 56, a controller 54 is used.

One common channel used for transmitting data to the UEs 20–24 is the forward access common channel (FACH) 58. As shown in FIG. 3, the FACH 58 originates in a RNC 36 and is sent to a node b 28–34 for wireless transmission as a spread spectrum signal to the UEs 20–24. The FACH 58 carriers several data types from various sources, such as a common control channel (CCCH), dedicated control and traffic channel (DCCH and DTCH), and a downlink and uplink share channel (DSCH and USCH) control signaling. The FACH 58 also carries control signaling out of band, such as hybrid automatic repeat request (H-ARQ), and similar data transmitted via the IR 62 from other RNCs 38–40, such as CCCH, DCCH, DTCH and H-ARQ control data.

Various controllers are used by the RNC 36 to control the flow of data. A radio link controller (RLC) 64 handles the CCCH. The dedicated medium access controller (MAC-d) 66 handles the DCCH, the DTCH and some out of band H-ARQ signaling. The shared medium access controller (MAC-sh) 68 handles the DSCH, USCH control signaling and out of band H-ARQ control signaling. Controlling the FACH 58 is the common medium access controller (MAC-c) 60.

Due to the multiple sources of data 48–52 that can be transmitted over a common or shared channel, the channel controllers 54 queue the data prior to transmission. If a large backlog develops in the queue, data in the queue develops a latency. A large latency of certain data such as control data will result in the failure of a channel. To alleviate this problem, the prior art either flushed the queue to reduce congestion or rerouted the data. Flushing the queue results in the loss of data and requires retransmission which is undesirable. Rerouting data already queued creates a duplication of data within the system and does not resolve the existing congestion. Accordingly, it is desirable to reduce the latency of data for shared and common channels without the problems associated with the prior art.

SUMMARY

Packet data from multiple types of data sources is stored. The data sources have reroutable and non-rereroutable data. The multiple types of data sources flow into a multiuser channel in a wireless spread spectrum code division multiple access communication system. A queue for incoming data from each data source is provided. A backlog of data in the queue is tracked. Based on in part the tracked backlog, data flow from each of the data sources is limited. For each data source capable of rerouting packet data, packet data is selectively rerouted. For each data source not capable of rerouting packet data, packet data is selectively not sent.

BRIEF DESCRIPTION OF THE DRAWING(S)

FIG. 5 is a prioritization scheme for use with a FACH channel.

DETAILED DESCRIPTION OF THE PREFERRED EMBODIMENT(S)

Figure 4:
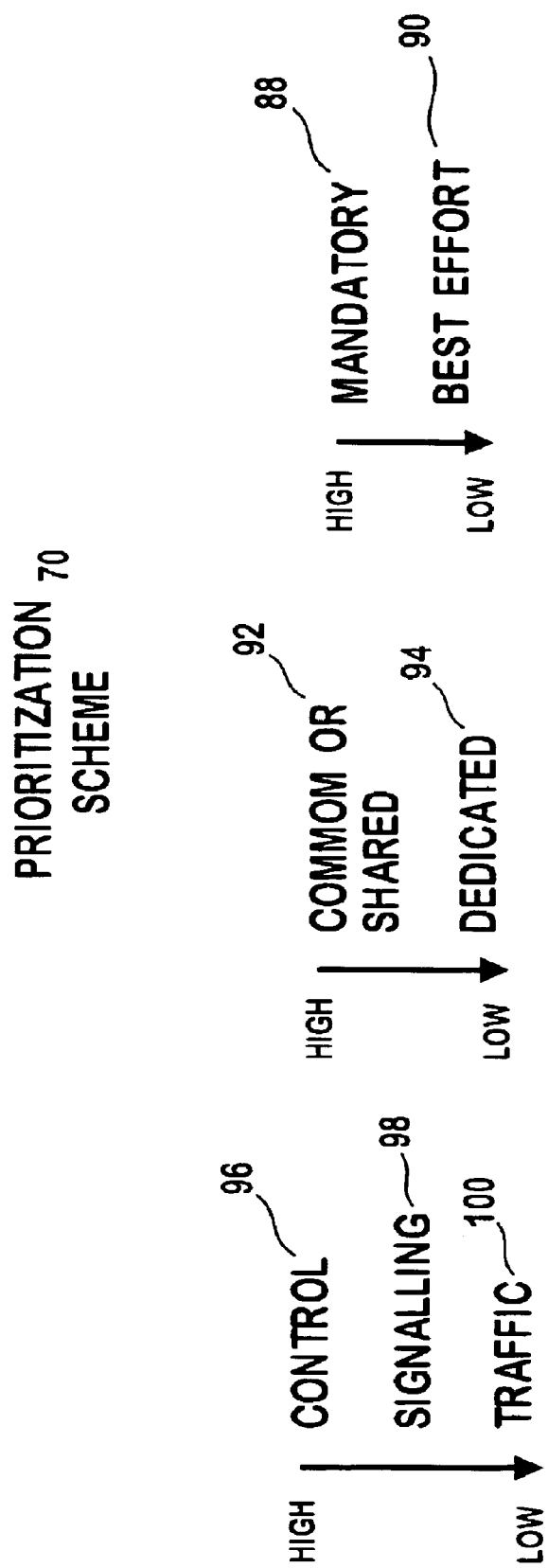
FIG. 4 is an illustration of a prioritization scheme.

Data prioritization 70 is used to reduce data latency in a multiuser channel controller 54 as illustrated in FIG. 4. For a particular common or shared channel, certain data must be transmitted on that channel and is shown in the figure as "mandatory" 88. Other data is preferably sent on the particular channel but may be rerouted to another channel, such as a dedicated channel. This data is referred to as "best effort" 90. Since "mandatory" data 88 is not reroutable, it takes priority over "best effort" data 90.

The type of the data within a packet, such as control 96, signaling 98 and traffic data 100, is also used for prioritization. To accomplish prioritization of the data type, control 96 and signaling 98 data packets are separated from traffic data packets 100. One approach to separating the packets is to group similar data type packets together prior to reception at the controller 54. Alternately, packets sent by each channel prior to reception by the controller 54 are provided with a flag or identifier indicating the packets' data type.

Since a prolonged delay in the transfer of control 96 or signaling 98 data results in a frozen channel, control 96 and signaling 98 data are given a higher priority than traffic data 100. Additionally, data associated with multiple users, common or shared 92, has a higher priority than data for a single user, dedicated 94. The data prioritization scheme is typically stored in the software of the multiuser channel's controller.

During periods of high congestion, data is rerouted to other channels based on its priority 70. For instance, best effort dedicated traffic data is rerouted and mandatory common control data is not. By rerouting data prior to queuing, retransmissions will not be required. Accordingly, the amount of queued data is reduced resulting in lower data latency. Additionally, since the rerouted data is never queued, the duplication of data as experienced in the prior art is eliminated.

A prioritization scheme 72 for use with a FACH 58 is shown in FIG. 5. Since the DSCH, H-ARQ of the MAC-sh have mandatory shared control data, they have the highest priority, highest. Although the H-ARQ of the MAC-d has mandatory control data, being dedicated it is assigned a slightly lower priority, high. The CCCH and DCCH are used for signaling and have the next level of priority, medium. The lowest level of priority is assigned to the DTCH because it has best effort dedicated traffic data.

Figure 1:
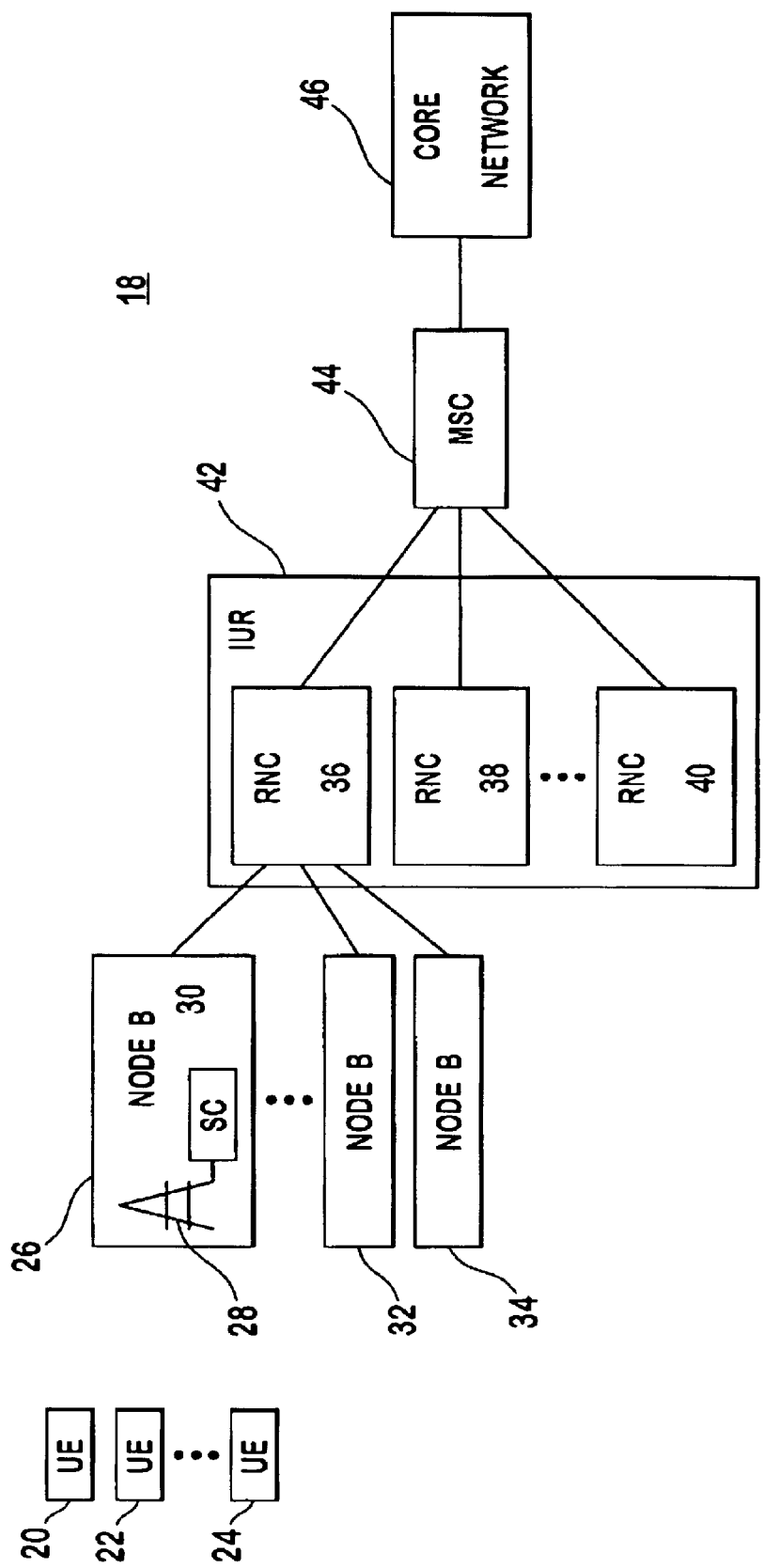
FIG. 1 is a simplified illustration of a wireless spread spectrum communication system.
Figure 2:
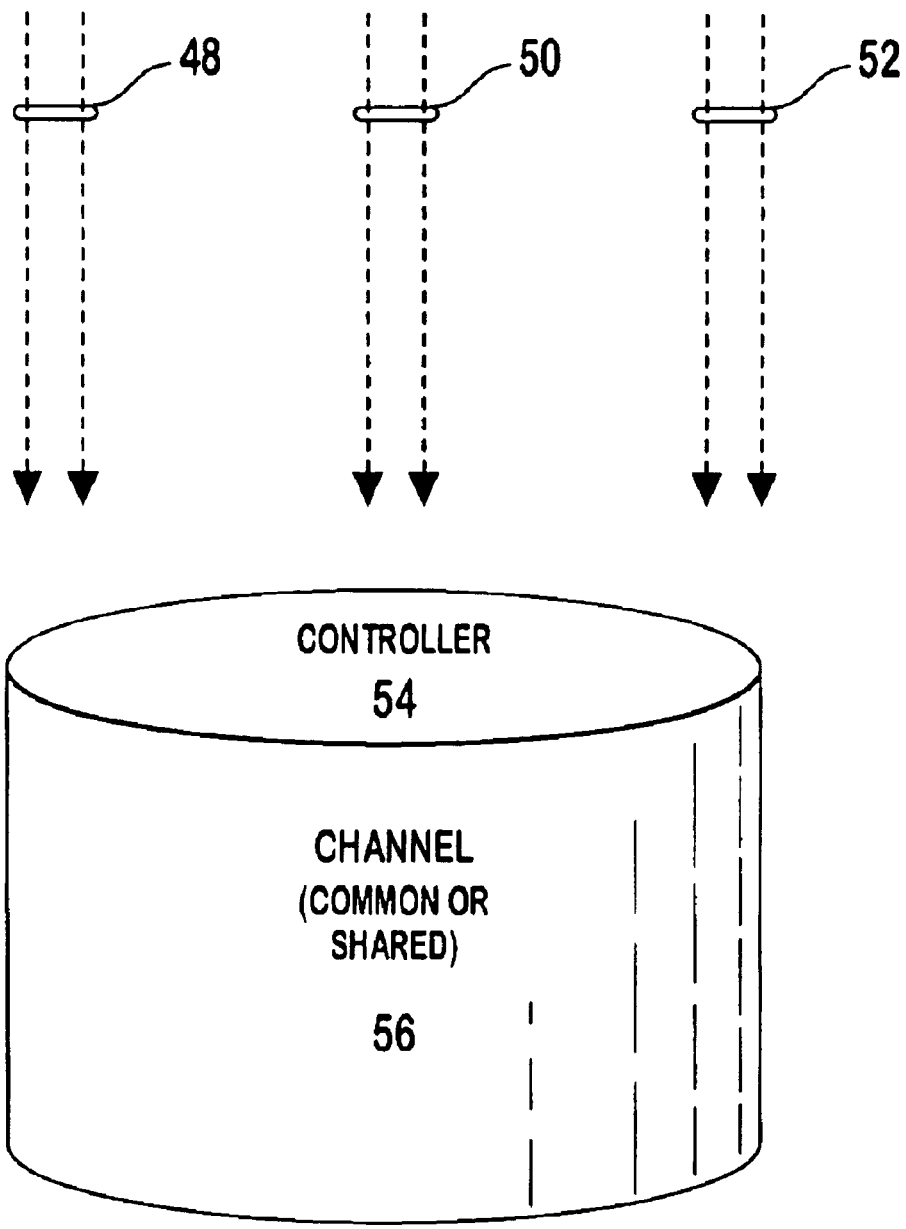
FIG. 2 is an illustration of data flowing into a common or shared channel.
Figure 3:
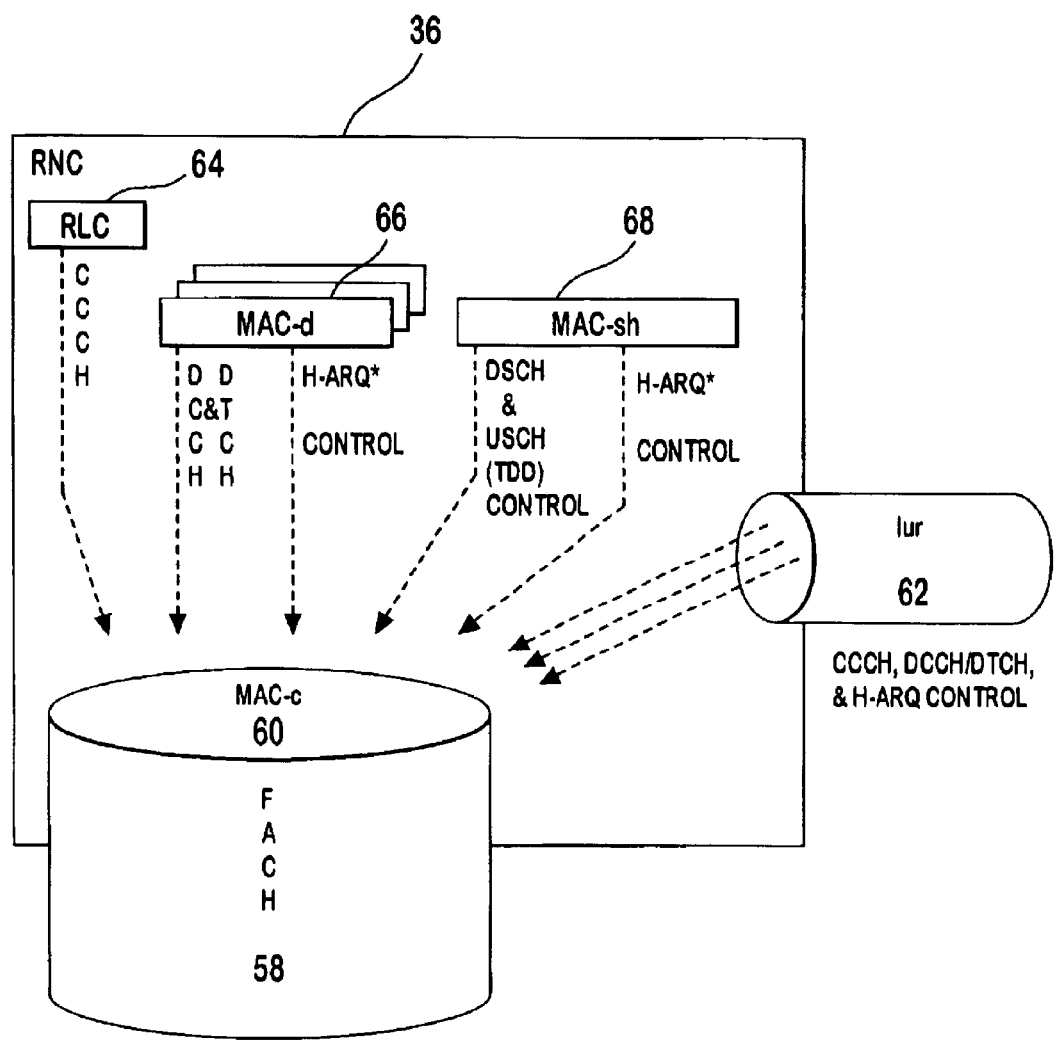
FIG. 3 is an illustration of data flowing into a FACH channel within a RNC.

To facilitate this prioritization scheme 72 for the FACH 58, modifications to the RNC 36 are required. As shown in FIG. 3, the prior art MAC-d 66 controls the DCCH, DTCH and MAC-d's H-ARQ. As shown in FIG. 5, each of these sources has a different priority. Since this data is multiplexed prior to prioritization at the MAC-d 66, the multiplexer of the MAC-d 66 is moved to the MAC-c 60 to allow prioritization at the MAC-c 60. Alternatively, the MAC-d 66 may send the priority and class (mandatory or best effort), such as by a flag or identifier, of each packet of the multiplexed data for prioritization at the MAC-c 60. The data controlled by the RLC 64 and the MAC-sh 68 have equal priority and accordingly, neither requires modification. Using the stored priority list, the data from the various sources is scheduled for transmission and rerouted during periods of high congestion.

Figure 6:
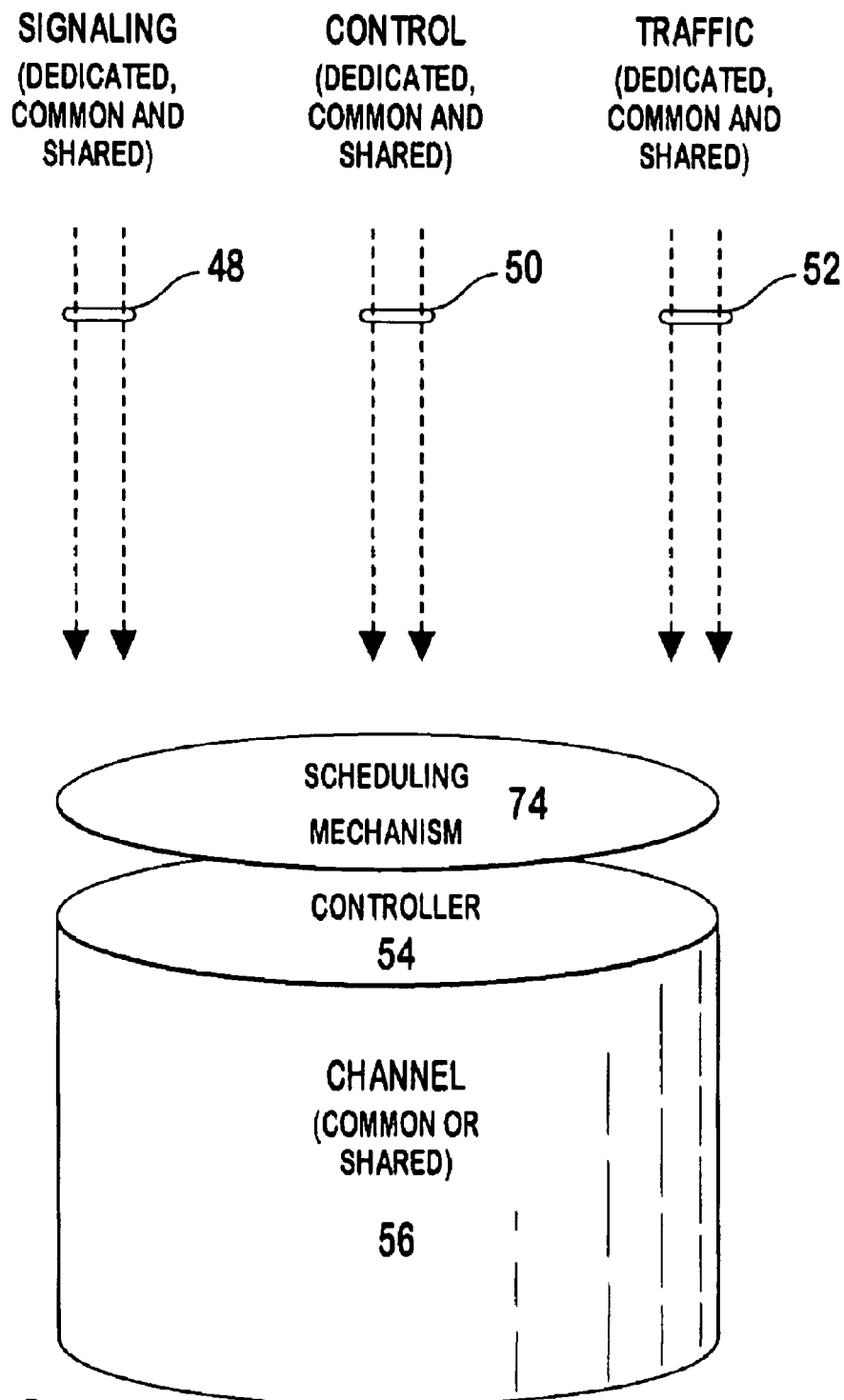
FIG. 6 depicts a reservation mechanism used with a common or shared channel.

Another technique for reducing the latency of data which may be combined with prioritization is to control the flow of data between the various controllers. As shown in FIG. 6, a scheduling mechanism 74 is used to regulate the data entering the common or shared channel 56. The scheduling mechanism 74 tracks the backlog of data in the controller's queue. If the mechanism 74 recognizes congestion and that the data will not be transmitted in a certain period of time, access to the channel 56 limits the flow of data from the individual data sources. The individual sources will recognize the need to reroute data or to not attempt transmission. Using a flow control mechanism with a FACH, MAC and RLC (Layer 2), the latency of signaling is decreased thus increasing efficiency.

Figure 7:
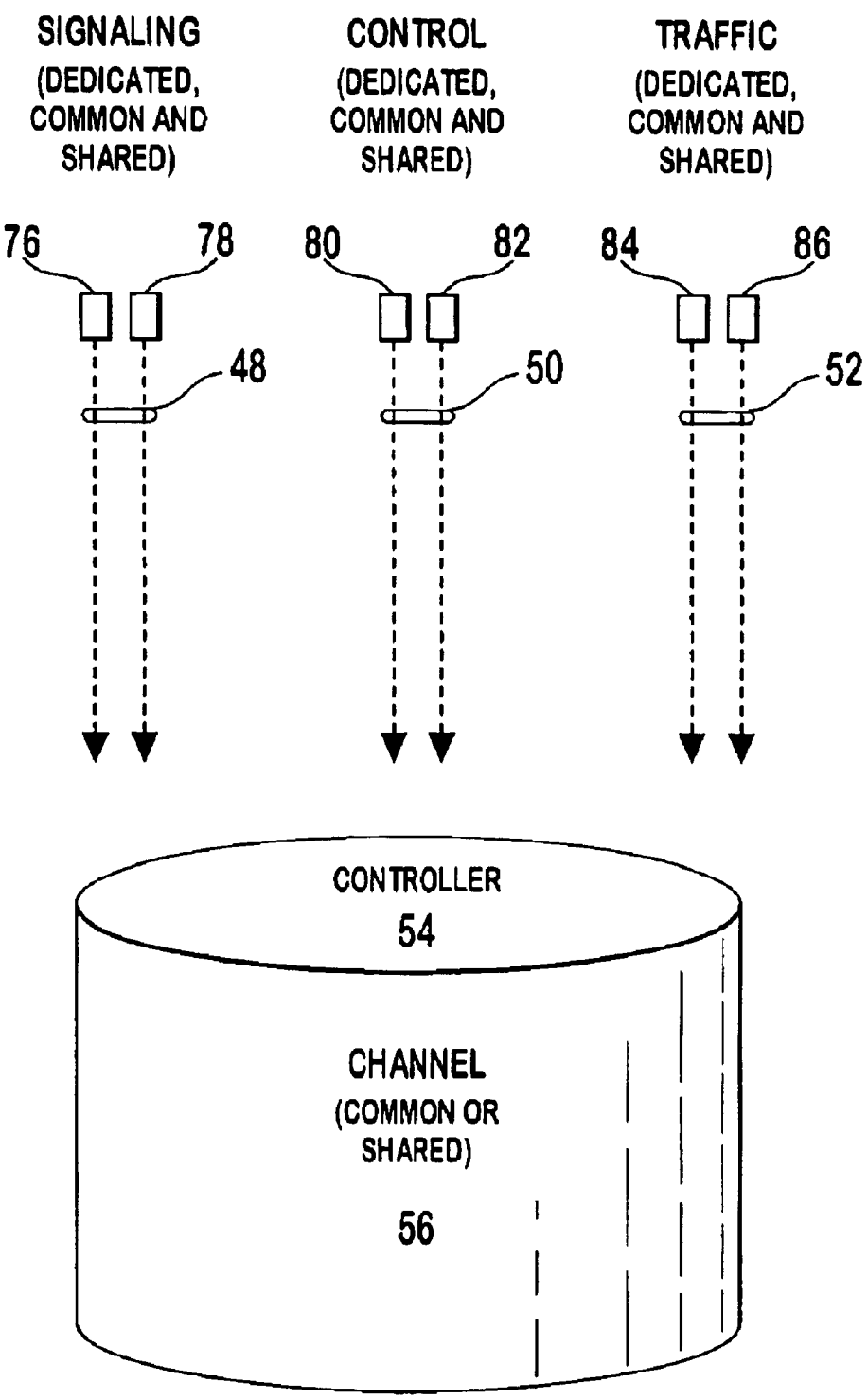
FIG. 7 depicts data source windows used with a common or shared channel.

To prevent the monopolization of the common or shared channel 56 by one data source 48–52 variable windows 76–86 may be used as shown in FIG. 7. Each data source 48–52 has a window or multiple windows 76–86 of outstanding data in the queue that it is permitted. The size of the window 76 is based on the requirements of the specific source. The window 76 is dynamically adjusted in response to the availability of the queue. As the availability of the channel increases, the size of the windows increases which increases the number of outstanding packets. Conversely, as the availability decreases, the size of the windows decreases which decreases the number of outstanding packets. As a result of the decreased windows, the data sources either reroute or stop sending packets to the windows.

What is claimed is:

1. A method for use in code division multiple access (CDMA) radio network controller (RNC) having a medium access controller—controlling/shared (MAC-c/sh) entity comprising:

providing a flow control entity for the MAC-c/sh entity;

controlling a flow of data through a forward access common channel (FACH) by a plurality of sources by the flow control entity;

permitting each source a specified amount of data to buffer for transfer over the FACH; and controlling the flow of the data for each source by the flow control entity in response to the specified amount and an associated priority of the data for that source.

2. A code division multiple access (CDMA) radio network controller (RNC) comprising:

a medium access controller—controlling/shared (MAC-c/sh) entity having a flow control entity, the flow control entity controls a flow of data by a plurality of sources through a forward access common channel (FACH), each source has a specified amount of data that it is permitted to buffer for transfer over the FACH, the flow control entity controls the flow of the data for each source in response to the specified amount and an associated priority of the data for that source.

* * * * *

UNITED STATES PATENT AND TRADEMARK OFFICE
CERTIFICATE OF CORRECTION

| | |
|---|---|
| PATENT NO. | : 7,020,151 B2 |
| APPLICATION NO. | : 10/053969 |
| DATED | : January 22, 2002 |
| INVENTOR(S) | : Stephen E. Terry |

It is certified that error appears in the above-identified patent and that said Letters Patent is hereby corrected as shown below:

ON THE TITLE PAGE

At item (56), FOREIGN PATENT DOCUMENTS, page 1, right column, after line 4, add:

--EP 0912015 A2 4/1999
EP 0912015 A3 5/1999
EP 0977393 A1 2/2000--.

At item (56), FOREIGN PATENT DOCUMENTS, page 1, right column, after line 7, add:

--WO 9608935 3/1996
WO 9847253 10/1998
WO 9909775 2/1999--.

At item (56), OTHER PUBLICATIONS, page 2, right column, line 8, after the word "Item", delete "Com-" and insert therefor --'Com- --.

At item (56), OTHER PUBLICATIONS, page 2, right column, line 9, after the word "on", delete "Iur," " and insert therefor --Iur,"--.

At item (56), OTHER PUBLICATIONS, page 2, right column, line 21, after the word "on", delete "Selecte" and insert therefor --Selected--.

At item (56), OTHER PUBLICATIONS, page 2, right column, after line 22, add the following:

--Chi-Qing Yang and Alapati V.S. Reddy, "A Taxonomy for Congestion Control Algorithms in Packet Switching Networks", IEEE Network, July/August 1995, pp. 34-35. TS 25.321 V2.0.1 MAC Protocol Specification, TSG-RAN Working Group 2 (Radio Layer 2 and Radio Layer 3), Berlin, Germany, May 25-28, 1999.
Stephen E. Terry, FACH Scheduling, Prioritization and Queue Management, 3GPP TSG-RAN WG2 #4, Berlin, Germany, May 25-28, 1999.--.

UNITED STATES PATENT AND TRADEMARK OFFICE
CERTIFICATE OF CORRECTION

PATENT NO. : 7,020,151 B2
APPLICATION NO. : 10/053969
DATED : January 22, 2002
INVENTOR(S) : Stephen E. Terry It is certified that error appears in the above-identified patent and that said Letters Patent is hereby corrected as shown below:

At column 1, line 42, after the words "originates in", delete "a" and insert therefor --an--.

At column 1, line 45, before the word "several", delete "carriers" and insert therefor --carries--.

At column 1, line 51, after the words "via the", delete "IR" and insert therefor --IUR--.

At column 2, line 7, after the word "congestion.", delete "According" and insert therefor --Accordingly--.

At column 2, line 13, after the word "and", delete "non-rereroutable" and insert therefor --non-reroutable--.

At column 2, line 30, after the word "within", delete "a" and insert therefor --an--.

At column 3, line 10, after the word "with", delete "a" and insert therefor --an--.

At column 3, line 13, after the word "priority", delete ", highest".

At column 4, line 1, after the word "with", delete "a" and insert therefor --an--.

Signed and Sealed this

Twenty-eighth Day of August, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,020,151 B2 | Page 1 of 2 |
| APPLICATION NO. | : 10/053969 | |
| DATED | : March 28, 2006 | |
| INVENTOR(S) | : Stephen E. Terry | |

It is certified that error appears in the above-identified patent and that said Letters Patent is hereby corrected as shown below:

ON THE TITLE PAGE

At item (56), FOREIGN PATENT DOCUMENTS, page 1, right column, after line 4, add:

--EP 0912015 A2 4/1999
EP 0912015 A3 5/1999
EP 0977393 Al 2/2000--.

At item (56), FOREIGN PATENT DOCUMENTS, page 1, right column, after line 7, add:

--WO 9608935 3/1996
WO 9847253 10/1998
WO 9909775 2/1999--.

At item (56), OTHER PUBLICATIONS, page 2, right column, line 8, after the word "Item", delete "Com-" and insert therefor --'Com- --.

At item (56), OTHER PUBLICATIONS, page 2, right column, line 9, after the word "on", delete "Iur," " and insert therefor --Iur,"--.

At item (56), OTHER PUBLICATIONS, page 2, right column, line 21, after the word "on", delete "Selecte" and insert therefor --Selected--.

At item (56), OTHER PUBLICATIONS, page 2, right column, after line 22, add the following:

--Chi-Qing Yang and Alapati V.S. Reddy, "A Taxonomy for Congestion Control Algorithms in Packet Switching Networks", IEEE Network, July/August 1995, pp. 34-35. TS 25.321 V2.0.1 MAC Protocol Specification, TSG-RAN Working Group 2 (Radio Layer 2 and Radio Layer 3), Berlin, Germany, May 25-28, 1999.
Stephen E. Terry, FACH Scheduling, Prioritization and Queue Management, 3GPP TSG-RAN WG2 #4, Berlin, Germany, May 25-28, 1999.--.

UNITED STATES PATENT AND TRADEMARK OFFICE
CERTIFICATE OF CORRECTION

| | | |
|---|---|---|
| PATENT NO. | : 7,020,151 B2 | |
| APPLICATION NO. | : 10/053969 | |
| DATED | : March 28, 2006 | |
| INVENTOR(S) | : Stephen E. Terry | |

It is certified that error appears in the above-identified patent and that said Letters Patent is hereby corrected as shown below:

At column 1, line 42, after the words "originates in", delete "a" and insert therefor --an--.

At column 1, line 45, before the word "several", delete "carriers" and insert therefor --carries--.

At column 1, line 51, after the words "via the", delete "IR" and insert therefor --IUR--.

At column 2, line 7, after the word "congestion.", delete "According" and insert therefor --Accordingly--.

At column 2, line 13, after the word "and", delete "non-rereroutable" and insert therefor --non-reroutable--.

At column 2, line 30, after the word "within", delete "a" and insert therefor --an--.

At column 3, line 10, after the word "with", delete "a" and insert therefor --an--.

At column 3, line 13, after the word "priority", delete ", highest".

At column 4, line 1, after the word "with", delete "a" and insert therefor --an--.

This certificate supersedes Certificate of Correction issued August 28, 2007.

Signed and Sealed this

Twenty-fifth Day of September, 2007

JON W. DUDAS
*Director of the United States Patent and Trademark Office*